Figure 1:
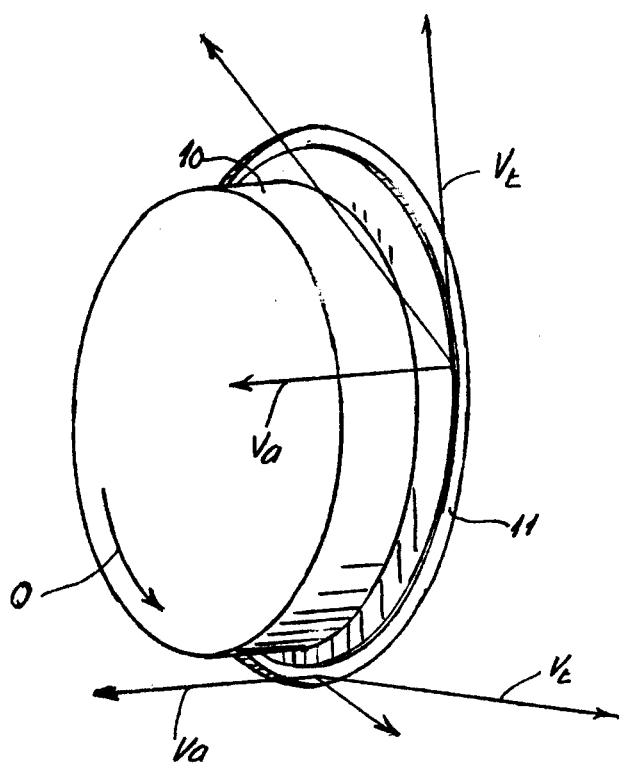

United States Patent [19]

Nielsen et al.

[11] 4,105,425
[45] Aug. 8, 1978

[54] APPARATUS FOR MANUFACTURE OF MINERAL WOOL

[75] Inventors: Verner Nielsen, Hellerup; Hobert Manfred Rasmussen, Hvidovre, both of Denmark

[73] Assignee: Rockwool International A/S, Hedehusene, Denmark

[21] Appl. No.: 846,954

[22] Filed: Oct. 31, 1977

Related U.S. Application Data

[63] Continuation of Ser. No. 716,851, Aug. 23, 1976, abandoned.

[30] Foreign Application Priority Data

Sep. 1, 1975 [DK] Denmark .............................. 3916/75

[51] Int. Cl.² ............................................ C03B 37/04
[52] U.S. Cl. ................................................ 65/14; 65/6
[58] Field of Search .......................................... 65/6, 14

[56] References Cited

U.S. PATENT DOCUMENTS

| | | | |
|---|---|---|---|
| 3,215,514 | 11/1965 | Leveague et al. | 65/6 |
| 3,328,714 | 9/1943 | Drill et al. | 65/6 |
| 3,336,125 | 8/1967 | Schachter | 65/14 |
| 3,649,234 | 3/1972 | Charpentier | 65/6 X |
| 3,785,791 | 1/1974 | Perry | 65/14 |

*Primary Examiner*—Robert L. Lindsay, Jr.
*Attorney, Agent, or Firm*—Lawrence Rosen; E. Janet Berry

[57] ABSTRACT

An apparatus for manufacture of mineral wool by which a flow of liquid melt is thrown off fast rotating rotors and cooled and transported to collecting means by means of a flow of air. According to the invention this flow of air besides an axial velocity component also has a tangential velocity component corresponding to tangential speed of the rotors at each point where air is introduced around the rotors.

3 Claims, 5 Drawing Figures

A-A

APPARATUS FOR MANUFACTURE OF MINERAL WOOL

The present application is a continuation of Ser. No. 716,851, filed Aug. 23, 1976 now abandoned.

The present invention relates to a method for the manufacture of mineral wool, by which method a flow of liquid melt is directed to the peripherical surface of one or more fast rotating rotors in such a way that the melt adheres to the surface or surfaces and are thrown therefrom in form of fibres which are cooled and transported to a collecting station by a flow of air being introduced into the area of the periphery of the rotors. The invention further relates to an apparatus for performing the method.

In the manufacture of mineral wool a flow of liquid melt at a temperature, which normally is in the area of 1000°-1400° C, produced by melting rock, slag, glass-forming raw-materials and other inorganic materials in an oven normally a Cupola oven, is led to the peripheral surface of a number of normally four fast rotating rotors. The rotors in pairs rotate in opposite directions thereby throwing the main flow of melt from upper rotor to the next and so forth, until all melt is slung away from the rotors in form of fibres of melt. This process normally is designated as a cascade spinning process.

In order to cool the fibres as well as transport the fibres to a conveyor on which they are collected and transported to further processing into mats, slabs, etc. for thermal and acoustic insulation, a flow of air in introduced along the periphery of the rotors from air distributing means. In order to avoid excessive cooling of the flow of melt between the rotors, no air is introduced into the interspace between the rotors. The air in introduced approximately parallel with the axis of the rotors.

Products manufactured from the mineral wool derived from the above process some times have non-satisfactory tensile strength, which may be a drawback for the finished products, being damaged during transport and mounting, but but this lack of tensile strength may also be inconvenient in some of the finishing processes by which the wool is collected as a comparatively thin layer on a first conveyor from which it is made up into a thicker web by means of an overlapping process. The low tensile strength is mostly found in products having a low specific weight, and has the consequence that a mineral wool product with a density of 20 kg/m$^3$, being otherwise economically favourable, cannot be produced with a tensile strength which is sufficient for its handling during transport and installation.

The object of the present invention is to provide a method for the manufacture of a mineral wool from which products having an improved tensile strength may be produced.

It is believed that the comparatively low tensile strength of mineral wool from cascade spinning is due to the fact that the finished wool is built up from tufts of mineral fibre and not from uniformly distributed fibres. The tufts may have a size of a few centimeters, and often the tufts have a greater density than the average density of the mineral wool. The number of fibres in the portions between the tufts, therefore, are too small to establish a sufficient and satisfactory coherence between the fibres in these portions to prevent the mineral wool from being pulled apart during the normal handling.

According to studies of what happens in the area around a rotor in the cascade spinning process, the formation of tufts are due to the fact that fibres by the spinning forms a coherent veil which to some extent is dragged with the rotation of the rotor owing to its mechanical coherence with the melt adhering to the rotors. At the same time the veil to some degree is drawn out in the axial direction of the rotor until the veil is torn apart by the air flow into tufts comprising coherent, tangled tufts.

The method according to the invention is characterized in that the flow of air is formed by partial flows being introduced side by side close to the outer contour of each rotor, each partial flow having such a direction that the flow besides an axial velocity also has a tangential velocity in the direction of movement of the rotor at the point of introduction of the partial flow.

Owing to the tangential velocity component in the air flow around each rotor, the veil of fibres will open before it is torn apart into tufts. This reduces the density of the tufts to such a level that substantially uniform mineral wool may be produced.

It has been proved that products from mineral wool obtain a tensile strength which is nearly the double of the tensile strength of products made according to the known process. The improved tensile strength is believed to be due to a more uniform fibre distribution in the mineral wool caused by the reduced density of the mineral fibre tufts.

The invention also relates to an apparatus for performing the method according to the invention. The apparatus comprises at least one fast rotating rotor having a flow of melt directed to its peripheral surface in such a way that the melt adheres to the surface or surfaces and is thrown therefrom in form of fibres being cooled and transported to collecting means by a flow of air being introduced into the area of the periphery of the rotors.

The apparatus is characterized in that close to each rotor at at least part of its periphery is a slot which is concentric with the rotor and in which are blades for forming partial air flows which besides an axial velocity component also have a tangential velocity component corresponding with the direction of movement of the rotor at the point of introduction of the partial flow, the distance between the blades being such that the partial flows integrate with the cooling and transporting air flow.

The blades may according to one embodiment are arranged on a flange at the periphery of each rotor, the flange forming one limitation of the slot, the other limitation being the walls of an air distribution chamber. This arrangement provides a good agreement in the tangential velocity and the rotational speed of the rotor. It is, however, also possible to mount the blades on the edge of the distributing chamber, forming an angle with respect to the axis of the rotor. With this arrangement it is possible to vary the flow of air and its direction along the periphery of the rotor and e.g. reduce the flow of air in the interspace between the rotors in order to reduce the cooling effect on the flow of melt.

It is preferred to place a screen in the area into which the flow of melt is introduced in order to prevent excessive cooling of the melt before it is spun into fibres.

Figure 2:
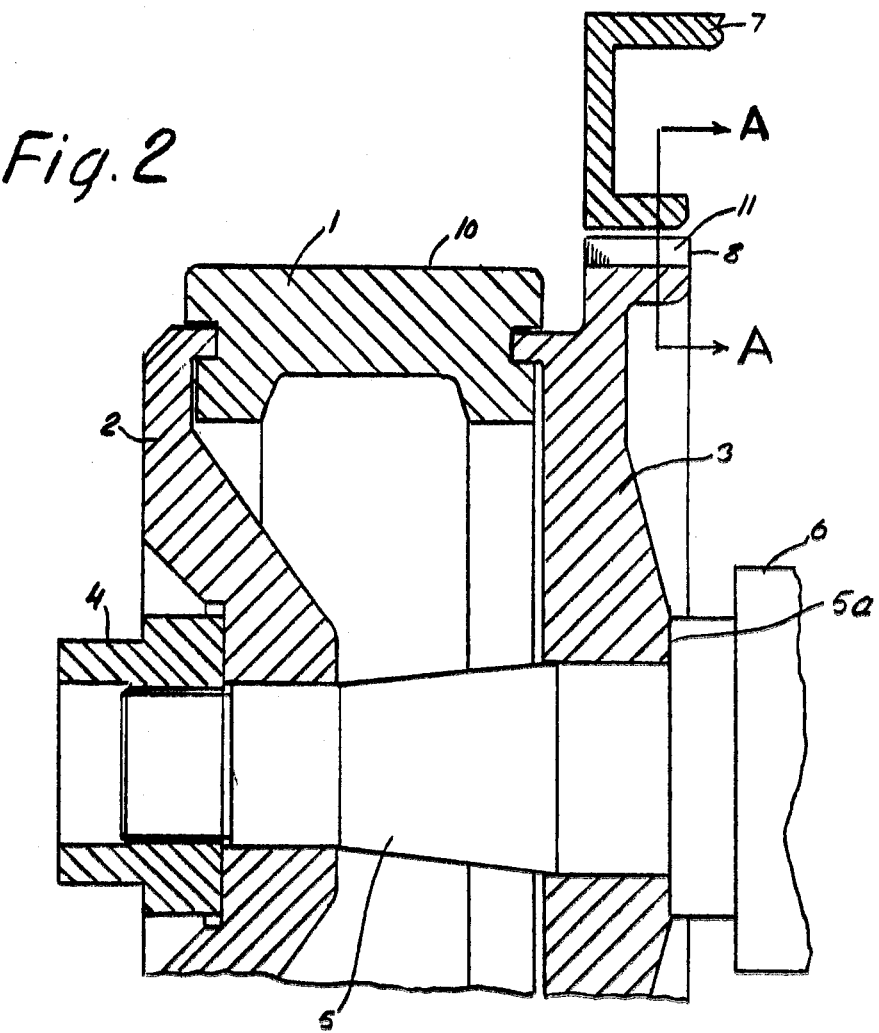
Figure 4:
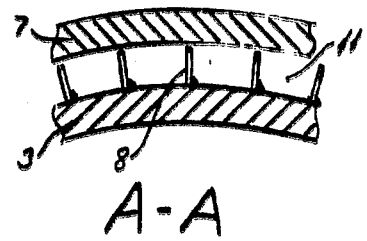
Figure 3:
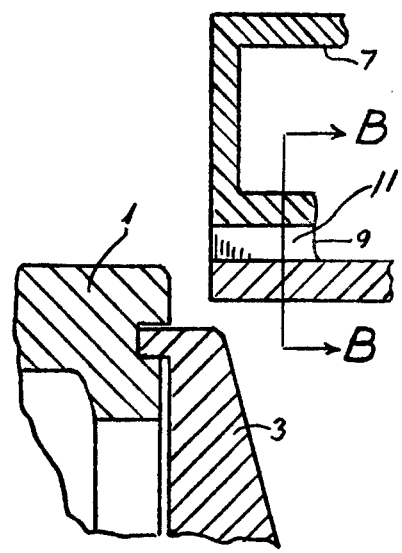
Figure 5:
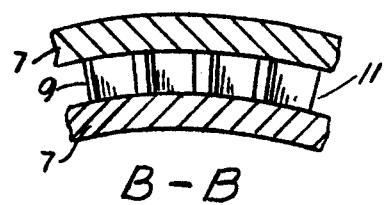

The invention is described in detail in the following description with reference to the drawings in which FIG. 1 is a perspective view of a spinning rotor showing the principle of the method according to the invention, FIG. 2 is an axial section through a rotor and a distribution chamber in an arrangement in which the blades are mounted on the rotor, FIG. 3 is a detail of a rotor and a distribution chamber in section with fixed blades in the air introduction slot, and FIGS. 4 and 5 show sections along AA and BB in FIG. 2 and 3 respectively.

FIG. 1 shows a rotor 1 rotating in the direction of the arrow 0. A flow of liquid melt falls on the peripheral surface 10 of the rotor, whereby the melt adheres to the surface, and the melt is drawn with the rotor for some distance before it is thrown away from the rotor in form of fibres of melt. Along the peripheral surface of the rotor a slot 11 is arranged concentric with the rotor and through which a flow of air is introduced for transport and cooling of the fibres. In the slot 11 blades are arranged providing the flow of air having an axial velocity component $V_a$ with a tangential component of velocity $V_t$ in the rotational direction of the rotor.

By introducing the cooling air in this way, the veil of fibres surrounding the rotor will open up before the fibres in form of tufts are transported to collecting means in form of a perforated band from the lower face of which the air is sucked away in order to deposit the fibres or tufts of fibres as a mat of mineral wool.

FIG. 2 shows an axial section through a rotor 1 which is mounted on a shaft 5, rotating in a bearing 6. The rotor comprises a rim with the peripheral surface 10 and flanges 2 and 3. The flanges and the rim are mounted by means of a nut 4 against an abutment 5a on the shaft. Along the periphery of the rim a slot 11 is provided between a collar on the inner flange and a wall 7 of an air distributing chamber, surrounding the bearing 6. In the slot blades 8 are arranged on the edge of the collar. The blades 8 are substantially parallel with the axis of the rotor and provides the flow of air with an tangential velocity $V_t$ owing to the rotation of the blades with the rotor.

FIG. 3 shows another embodiment of the means for introducing the cooling and the transport air. The slot 11 is arranged between flanges on the wall 7 of the air distribution chamber, and in the slot 11 are the blades 9 mounted forming an angle with the axis of the rotor.

FIG. 4 shows a section along AA in FIG. 2. It is seen that the blades 8 are substantially parallel with the axis of the rotor, while FIG. 5 showing a section along BB in FIG. 3 shows that the blades 9 form an angle with respect to the axis of the rotor.

With the embodiment according to FIG. 2 it is obtained that the tangential velocity of the air will correspond exactly to the velocity of the outer surface of the rotor. Furthermore, the housing for the bearing can be used as air distribution chamber, making this part of the apparatus easier to clean and maintain. The drawback of this embodiment is that the unavoidable clearance between the tips of the blades may result in formation of an unintended turbulence in the air flow. The embodiment according to FIG. 3 has not this drawback, and further makes a variation in the flow of air along the slot possible, e.g. it is possible to reduce the flow of air at the point of introduction of the flow of melt in order to reduce the cooling effect at this point.

A heat insulating material containing a bonding agent and which is manufactured according to the new method has a density or specific weight of 29 kg/m$^3$. Insulating material normally contains a bonding agent connecting the fibres at intersection points. The bonding agent in the insulating material is a phenolic resin making up 1.45% of the total weight of the material. The tensile strength of this insulating material is 11.0 kN/m$^2$. For comparison an insulating material made according to a known cascade spinning process and having identical density and contents of bonding agent is 6.3 kN/m$^2$.

We claim:

1. In apparatus for the manufacture of mineral wool which includes at least one high speed horizontally disposed cylindrical rotor, means for directing a flow of liquid melt onto the peripheral surfaces of said rotor during rotation thereof, and an air distribution chamber including means for directing an air flow axially of and along the contour of the rotor for cooling the fibers formed and for transporting said fibers to collecting means; the improvement which comprises providing an annular slot adjacent to, concentric with and radially outwardly of the peripheral surface of each rotor, positioning a plurality of blades in said slot in substantially parallel disposition with each other and with the axis of the rotor and mounted to be rotatable therewith, the blades being thus positioned to provide a series of air flows having axial velocity as well as tangential velocity in the rotational direction of the rotor at the points of introduction thereto equal to the peripheral velocity of the rotor, the distance between the blades being such that the series of air flows integrate to thereby form the cooling and transporting air flow.

2. Apparatus for the manufacture of mineral wool according to claim 1, including inner and outer flange members releasably connected to said rotor at the opposed axial ends thereof and adapted to secure said rotor to a horizontal rotatable drive shaft for rotation therewith, said blades being formed integrally with said inner flange member about the outer periphery thereof.

3. Apparatus for the manufacture of mineral wool according to claim 2, including bearing means for rotatably supporting the drive shaft, said air distribution chamber surrounding said bearing means and having a wall concentric with and radially outwardly of said inner flange to define said slot therewith.

* * * * *